US010877233B1

(12) United States Patent
Dai et al.

(10) Patent No.: US 10,877,233 B1
(45) Date of Patent: Dec. 29, 2020

(54) ACTIVE ETHERNET CABLE WITH PRESET PRE-EQUALIZATION

(71) Applicant: CREDO TECHNOLOGY GROUP LIMITED, Grand Cayman (KY)

(72) Inventors: Yifei Dai, Shanghai (CN); Yattung Lam, Palo Alto, CA (US); Rajan Pai, San Jose, CA (US)

(73) Assignee: CREDO TECHNOLOGY GROUP LIMITED, Grand Cayman (KY)

( * ) Notice: Subject to any disclaimer, the term of this patent is extended or adjusted under 35 U.S.C. 154(b) by 0 days.

(21) Appl. No.: 16/698,935

(22) Filed: Nov. 27, 2019

(51) Int. Cl.
*G02B 6/42* (2006.01)
*G02B 6/38* (2006.01)

(52) U.S. Cl.
CPC .......... *G02B 6/4284* (2013.01); *G02B 6/387* (2013.01); *G02B 6/3846* (2013.01)

(58) Field of Classification Search
CPC ..... G02B 6/4284; G02B 6/3846; G02B 6/387
See application file for complete search history.

(56) References Cited

U.S. PATENT DOCUMENTS

| 7,401,985 | B2 | 7/2008 | Aronson et al. | |
|---|---|---|---|---|
| 9,322,704 | B1 | 4/2016 | Neveux | |
| 2007/0237464 | A1* | 10/2007 | Aronson | G02B 6/4416 385/89 |
| 2013/0343400 | A1* | 12/2013 | Lusted | H04L 12/413 370/419 |

(Continued)

FOREIGN PATENT DOCUMENTS

WO   2018161273 A1   9/2018

OTHER PUBLICATIONS

Rumer, B. (Feb. 1, 2001). Fighting Jitter in Fibre-Channel Designs. EE Times. Retrieved Jan. 23, 2019, from https://www.eetimes.com/document.asp?doc_id=1277249#.

(Continued)

*Primary Examiner* — Andrew Jordan
(74) *Attorney, Agent, or Firm* — Ramey & Schwaller LLP; Daniel Krueger

(57) ABSTRACT

A cable, a manufacturing method, and a communications method, employing preset transmit-side equalization to provide enhanced performance and/or to reduce receive-side equalization requirements. One illustrative cable embodiment includes: a first data recovery and re-modulation (DRR) device that exchanges inbound and outbound multi-lane data streams with a first host interface port via a first end connector plug; a second DRR device that exchanges inbound and outbound multi-lane data streams with a second host interface port via a second end connector plug; and electrical conductors connecting the first and second DRR devices to convey electrical transit signals therebetween. The first DRR device converts between said electrical transit signals and said inbound and outbound multi-lane data streams for the first host interface port, and the second DRR device converts between said electrical transit signals and said inbound and outbound multi-lane data streams for the second host interface port. The first and second DRR devices provide pre-equalization of the electrical transit signals using transmit filter coefficient values stored in nonvolatile memories.

20 Claims, 4 Drawing Sheets

(56) References Cited

U.S. PATENT DOCUMENTS

| | | | | |
|---|---|---|---|---|
| 2014/0086264 A1* | 3/2014 | Lusted | ................... | H04L 69/14 370/470 |
| 2014/0146833 A1* | 5/2014 | Lusted | ................. | H04L 12/413 370/437 |
| 2015/0334186 A1* | 11/2015 | Chen | ..................... | H04N 7/183 348/143 |
| 2020/0280329 A1* | 9/2020 | Lam | ........................ | H04B 1/38 |
| 2020/0280458 A1* | 9/2020 | Lam | ................... | H04L 25/4917 |

OTHER PUBLICATIONS

Management Data Input/Output. (Nov. 25, 2018). Wikiepedia. Retrieved Jan. 23, 2019, from https://en. wikipedia.org/wiki/Management_Data_Input/Output.

QSFP-DD MSA-QSFP-DD Hardware Specification for QSFP Double Density 8X Pluggable Transceiver Rev 4.0 Candidate. Aug. 15, 2018.

40 Gigabit Ethernet, 40G QSFP+, 40GBASE-LR4, 40G-BASE-SR4, CFP module, CXP Transceiver, MPO MTP Fiber on May 25, 2015 [http://www.cables-solutions.com/guide-to-40-gigabit-ethernet-options.html].

IEEE P802.3cd/D1.2, Feb. 3, 2017 (Amendment of IEEE Std 802.3-2015 as amended) IEEE Draft Standard for Ethernet Amendment: Media Access Control Parameters for 50 Gb/s, 100 Gb/s and 200 Gb/s Operation.

Ex Parte Quayle Action dated Mar. 11, 2020 for U.S. Appl. No. 16/539,910.

Notice of Allowance dated Jun. 4, 2020 for U.S. Appl. No. 16/539,910.

Restriction Requirement dated May 1, 2020 for U.S. Appl. No. 16/541,094.

Non Final Office Action dated Sep. 9, 2020 for U.S. Appl. No. 16/541,094.

Notification of Reopening of Prosecution Due to Consideration of Information Disclosure Statement Filed After Mailing of a Notice of Allowance dated Oct. 5, 2020 for U.S. Appl. No. 16/539,910.

* cited by examiner

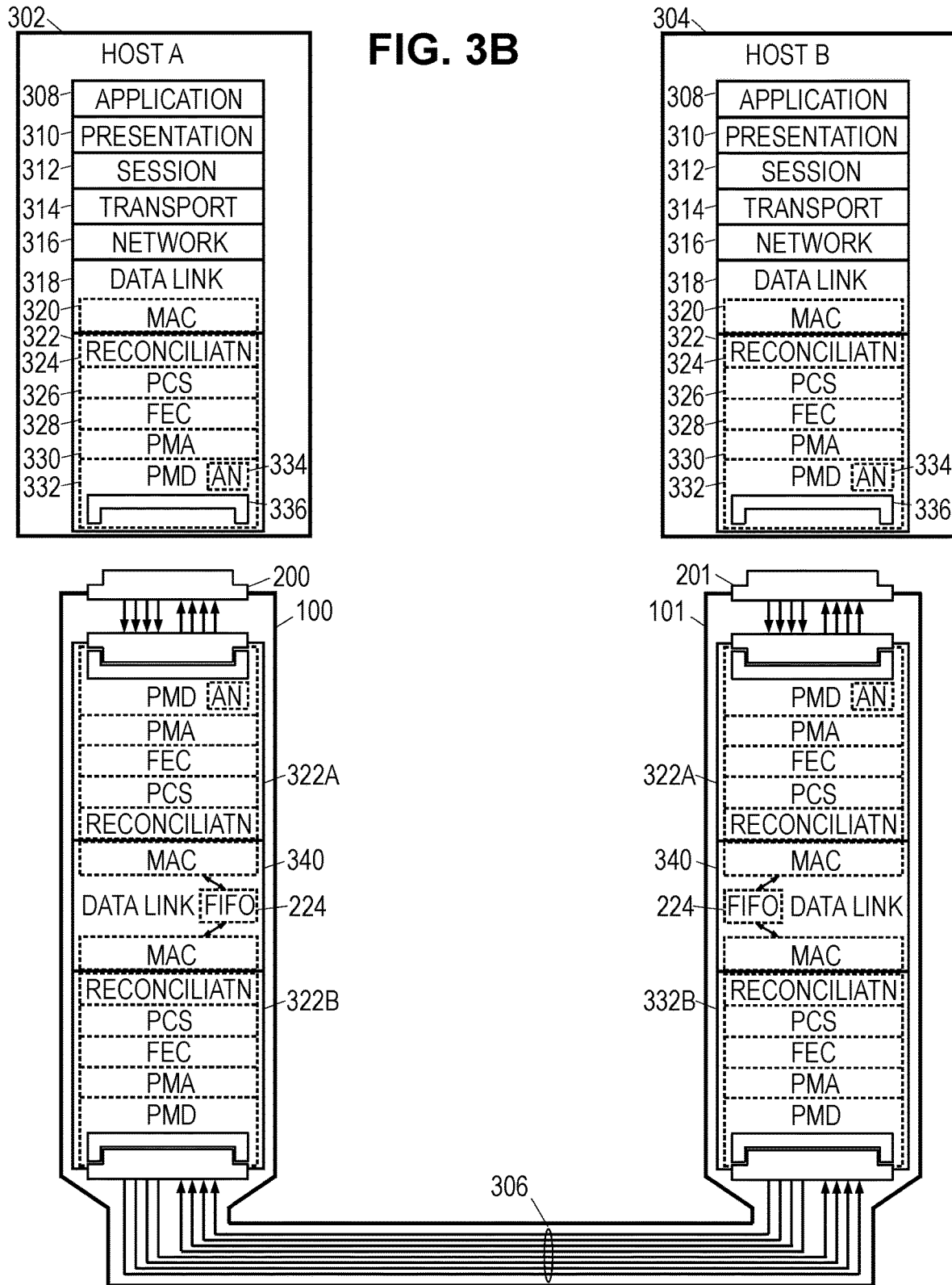

ACTIVE ETHERNET CABLE WITH PRESET PRE-EQUALIZATION

BACKGROUND

The Institute of Electrical and Electronics Engineers (IEEE) Standards Association publishes an IEEE Standard for Ethernet, IEEE Std 802.3-2015, which will be familiar to those of ordinary skill in the art to which this application pertains. This Ethernet standard provides a common media access control specification for local area network (LAN) operations at selected speeds from 1 Mb/s to 100 Gb/s over coaxial cable, twinaxial cable, twisted wire pair cable, fiber optic cable, and electrical backplanes, with various channel signal constellations. As demand continues for ever-higher data rates, the standard is being extended. Such extensions to the standard must account for increased channel attenuation and dispersion even as the equalizers are forced to operate at faster symbol rates. It is becoming increasingly difficult to provide affordable, mass-manufactured network hardware that assures consistently robust performance as the proposed per-lane bit rates rise beyond 50 Gbps with PAM4 or larger signal constellations over distance spans more than a couple of meters.

For distance spans of no more than 2 meters, attenuation is reasonably limited such that passive copper cable, also known as direct-attach cable or "DAC", can be employed. Data centers having larger distance spans are forced to rely on active optical cable (AOC) designs, which convert the electrical interface signals into optical signals transported by optical fiber, even though such cables come with a prohibitively high cost. Active ethernet cable (AEC) is a newly-designed cable that offers affordable high-bandwidth data transport over distance spans up to at least seven meters using hard-wired data recovery and remodulation (DRR) chips in the cable connectors.

As cable lengths are extended, the increased channel attenuation and dispersion necessitates increasing levels of equalization, to the point that receiver power consumption and dissipation may reach prohibitive levels.

SUMMARY

Accordingly, there are disclosed herein a cable, a manufacturing method, and a communications method, employing preset transmit-side equalization to provide enhanced performance and/or to reduce receive-side equalization requirements. One illustrative cable embodiment includes: a first data recovery and re-modulation (DRR) device that exchanges inbound and outbound multi-lane data streams with a first host interface port via a first end connector plug; a second DRR device that exchanges inbound and outbound multi-lane data streams with a second host interface port via a second end connector plug; and electrical conductors connecting the first and second DRR devices to convey electrical transit signals therebetween. The first DRR device converts between said electrical transit signals and said inbound and outbound multi-lane data streams for the first host interface port, and the second DRR device converts between said electrical transit signals and said inbound and outbound multi-lane data streams for the second host interface port. The first and second DRR devices provide pre-equalization of the electrical transit signals using transmit filter coefficient values stored in nonvolatile memories.

An illustrative embodiment of a cable manufacturing method includes: connecting a first connector plug to a first data recovery and re-modulation (DRR) device that exchanges multi-lane data streams with a first host interface port via the first connector plug; connecting a second connector plug to a second DRR device that exchanges multi-lane data streams with a second host interface port via the second connector plug; connecting electrical conductors to the first and second DRR devices to convey electrical transit signals therebetween. The first DRR device converts between said electrical transit signals and said multi-lane data streams for the first host interface port, and the second DRR device converts between said electrical transit signals and said multi-lane data streams for the second host interface port. The first and second DRR devices provide pre-equalization of the electrical transit signals using transmit filter coefficient values stored in nonvolatile memories.

An illustrative embodiment of a communications method includes: inserting a first end connector plug of a cable into a first host interface port, the first end connector plug being connected to a first data recovery and re-modulation (DRR) device that converts a multi-lane data stream from the first host interface port into electrical transit signals conveyed by electrical conductors to a second DRR device connected to a second end connector plug of the cable; and inserting the second end connector plug of the cable into a second host interface port, the second DRR device converting a multi-lane data stream from the second host interface port into electrical transit signals conveyed by electrical conductors to the first DRR device. The first and second DRR devices provide pre-equalization of the electrical transit signals using transmit filter coefficient values stored in nonvolatile memories.

Each of the foregoing embodiments may be implemented individually or in combination, and may be implemented with one or more of the following features in any suitable combination: 1. a first controller that configures the first DRR device in response to a power-on event, the first controller retrieving the transmit filter coefficient values from the nonvolatile memories as part of said configuring. 2. the first and second DRR devices are programmed to use the transmit coefficient values each time power is supplied to the first and second end connector plugs. 3. the transmit filter coefficient values are determined and stored in the nonvolatile memories after assembly of the cable. 4. the first and second DRR devices employ receiver-based equalization of the electrical transit signals using coefficient values stored in the nonvolatile memories. 5. the electrical conductors comprise twin-axial conductors that carry each of the electrical transit signals in differential form. 6. the first and second DRR devices do not perform pre-equalization of the multi-lane data streams provided to the first and second host interface ports. 7. providing a first controller device that configures the first DRR device in response to a power-on event, the first controller device retrieving the transmit filter coefficient values from an internal nonvolatile memory as part of said configuring. 8. programming the first and second DRR devices to use the transmit coefficient values each time power is supplied to the first and second end connector plugs. 9. after connecting the electrical conductors, characterizing channel characteristics of the electrical conductors to determine the transmit filter coefficient values; and storing the transmit filter coefficient values in the nonvolatile memories. 10. the first and second DRR devices employ receiver-based equalization of the electrical transit signals using coefficient values stored in the nonvolatile memories. 11. supplying power to the first and second end connector plugs, the first and second end connector plugs being connected to first and second controller devices, respectively, each of the first and second controller devices operating to configure the first and second DRR devices in response to a power-on event, the configuring including retrieving the transmit filter coefficient values from internal nonvolatile memory.

BRIEF DESCRIPTION OF THE DRAWINGS

FIG. 3B is an architectural diagram for a communications link including the illustrative cable.

DETAILED DESCRIPTION

Figure 1:
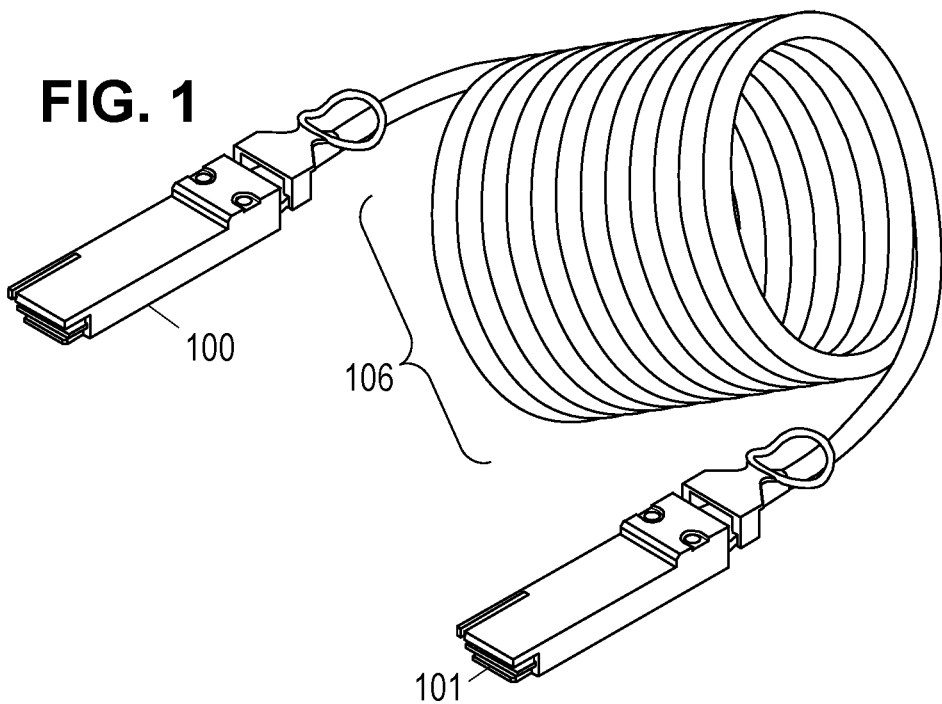
FIG. 1 is a perspective view of an illustrative active Ethernet cable (AEC).

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

FIG. 1 is a perspective view of an illustrative cable that may be used to provide a high-bandwidth communications link between devices in a routing network. The routing network may be or include, for example, the Internet, a wide area network, a storage area network, or a local area network. The linked devices may be computers, switches, routers, and the like. The cable includes a first connector 100 and a second connector 101 that are electrically connected via electrical conductors 106 in a cord. The electrical conductors 106 may be electrically conductive wires arranged in a paired form such as with twinaxial conductors. Twinaxial conductors can be likened to coaxial conductors, but with two inner conductors instead of one. The inner conductors may be driven with a differential signal and their shared shield operates to reduce crosstalk with other twinaxial conductors in the cable. Depending on the performance criteria, it may be possible to employ other paired or single-ended conductor implementations.

Pursuant to the Ethernet standard, each conductor pair may provide unidirectional transport of a differential signal. To enable robust performance over even extended cable lengths, each connector 100, 101 may include a powered transceiver that performs clock and data recovery (CDR) and re-modulation of data streams, hereafter called a data recovery and re-modulation (DRR) device. The DRR devices process data streams traveling in each direction. Notably, the transceivers perform CDR and re-modulation not only of the inbound data streams to the host interface as they exit the cable, but also of the outbound data streams from the host interface entering the cable. (NB: This inbound/outbound terminology is reversed relative to related applications by the present applicant.)

It is acknowledged here that the outbound data streams may be expected to be compliant with the relevant standard (e.g., the Ethernet standard for 400 Gbps) and may be expected to have experienced essentially no deterioration from their traversal of the network interface port's receptacle pins and the cable assembly's connector plug pins. Nevertheless, the modulation quality and equalization strategy employed by the electronics manufacturer of the transmitting network interface is generally unknown and the minimum requirements of the standard may be inadequate for transport over an extended cable length, particularly if the electronics manufacturer of the receiving network interface is different than that of the transmitting network interface. As with the transmitting network interface, the equalization and demodulation strategy employed by the electronics manufacturer of the receiving network interface is generally unknown and may be unable to cope with the attenuation and interference caused by signal transport over an extended cable length, particularly if the connectors aren't fully seated or if the contacts have tarnished. By performing DRR of both inbound and outbound data streams, the illustrative cable ensures that the electrical signals transiting the cable conductors are able to withstand the attenuation and interference encountered between the cable's end connectors, thereby enabling consistently robust data transfer over extended cable lengths to be assured without consideration of these factors.

Figure 2:
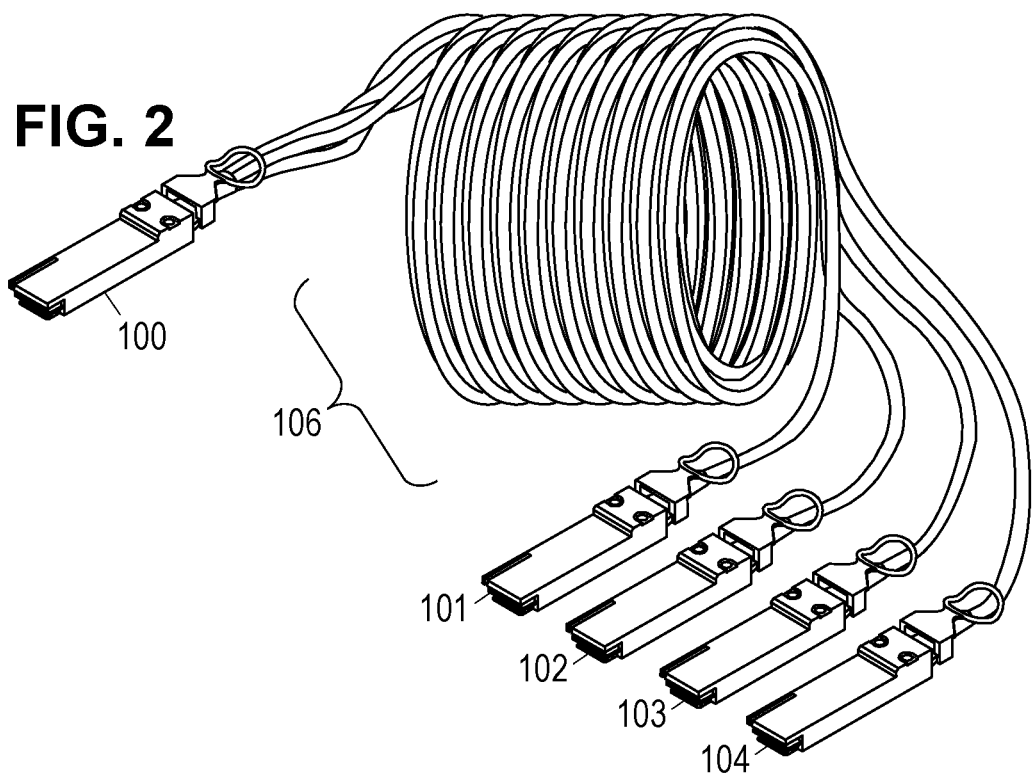
FIG. 2 is a perspective view of an illustrative 1:4 breakout AEC.

Though a 1:1 cable has been used in the foregoing description, the principles disclosed hereinbelow are also applicable to format conversion cables and to breakout cable designs. FIG. 2 is a perspective view of an illustrative 1:4 breakout cable having a unary end connector 100 which may be designed for sending and receiving a 200 Gbps Ethernet data stream, e.g., in the form of 4 lanes of 50 Gbps, each lane using PAM4 at 26.5625 GBd. Electrical conductors 106 are encased as four cords each carrying 1 lane of PAM4 at 26.5625 GBd (50 Gbps) or 2 lanes of non-return to zero (NRZ) signaling at 26.5625 GBd (25 Gbps) to a corresponding one of the split-end connectors 101-104. Each of the split-end connectors 101-104 may be designed for sending and receiving a 50 Gbps Ethernet data stream. Such breakout cables are useful for linking host devices designed to different generations of the Ethernet standard. As another example, the unary end connector may be designed for sending and receiving 400 Gbps (8 lanes of 50 Gbps PAM4), while each of the split-end connectors may be designed for sending and receiving 100 Gbps (4 lanes of 25 Gbps NRZ). At either the unary end or at the split ends, the DRR devices may provide format conversion by, e.g., converting 1 lane of PAM4 symbols into 2 lanes of NRZ symbols, and vice versa.

Figure 3A:
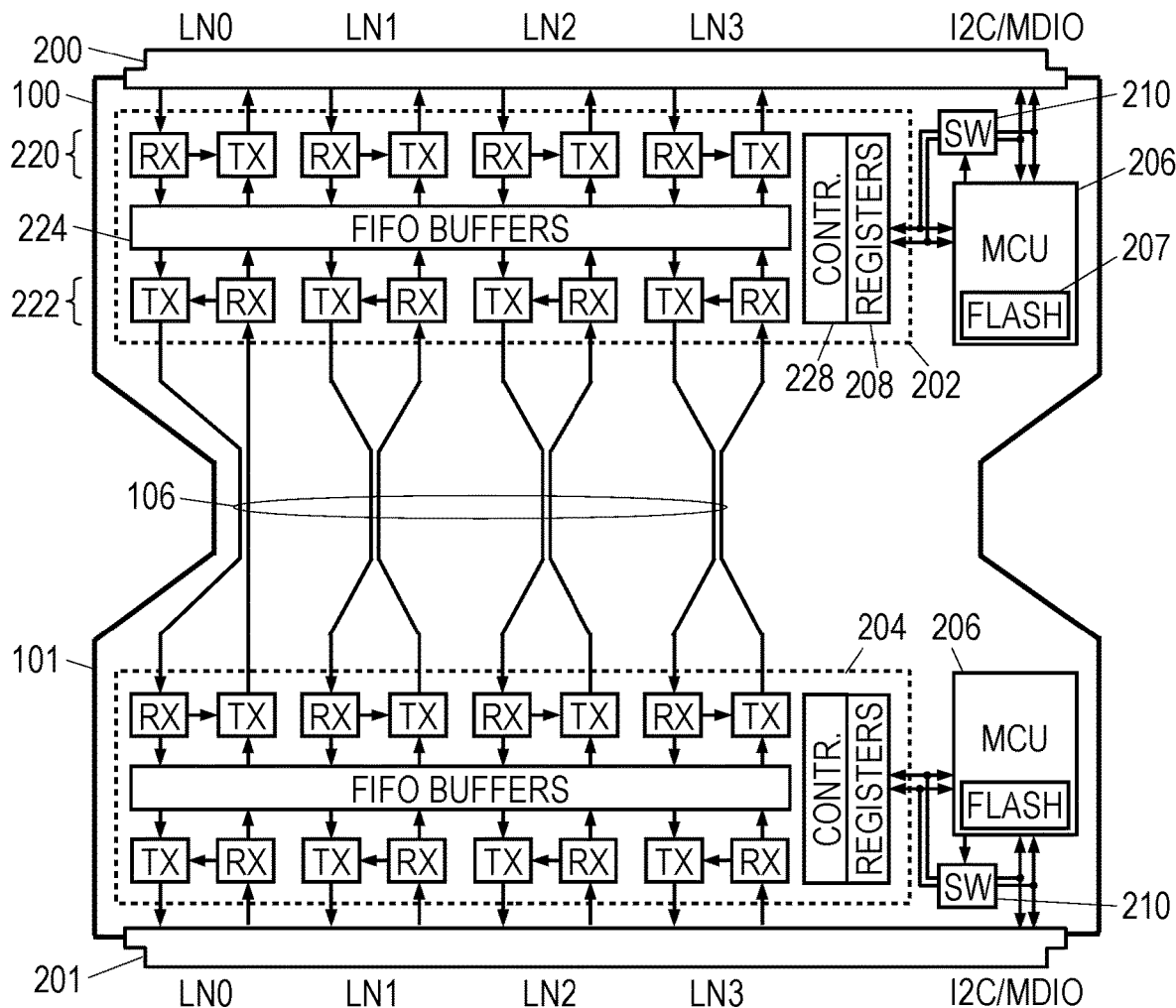
FIG. 3A is a function-block diagram of the illustrative AEC.

FIG. 3A is a function-block diagram of the illustrative cable of FIG. 1. Connector 100 includes a plug 200 adapted to fit a standard-compliant Ethernet port in a first host device 302 (see FIG. 3B) to receive an electrical input signal carrying an outbound data stream from the host device and to provide an electrical output signal carrying an inbound data stream to the host device. Similarly, connector 101 includes a plug 201 that fits an Ethernet port of a second host device 304. Connector 100 includes a first DRR device 202 to perform CDR and re-modulation of the data streams entering and exiting the cable at connector 100, and connector 101 includes a second DRR device 204 to perform CDR and re-modulation of the data streams entering and exiting the cable at connector 101. The DRR devices 202, 204 may be integrated circuits mounted on a printed circuit board and connected to connector plug pins via circuit board traces. The wires of cord 106 may be soldered to corresponding pads on the printed circuit board that electrically connect to the DRR devices.

In at least some contemplated embodiments, the printed circuit boards each also support a micro-controller unit (MCU) 206 and a bypass switch (SW) 210. Each DRR device 202, 204 is coupled to a respective MCU device 206 which configures the operation of the DRR device via a first two-wire bus. At power-on, the MCU device 206 loads equalization parameters from Flash memory 207 into the DRR device's configuration registers 208. The host device can access the MCU device 206 via a second two-wire bus that operates in accordance with the I2C bus protocol and/or the faster MDIO protocol. With this access to the MCU device 206, the host device can adjust the cable's operating parameters and monitor the cable's performance as discussed further below. The bypass switch 210 enables the MCU device 206 to electrically connect the first two-wire bus to the second two-wire bus, enabling the host to bypass the MCU device 206 and communicate directly with the DRR device as discussed in greater detail below.

Each DRR device 202, 204, includes a set 220 of transmitters and receivers for communicating with the host device and a set 222 of transmitters and receivers for sending and receiving via conductor pairs running the length of the cable. The illustrated cable supports four bidirectional communication lanes LN0-LN3, each bidirectional lane formed by two unidirectional connections, each unidirectional connection having a differentially-driven twinaxial conductor pair (with a shield conductor not shown here). The transceivers optionally include a memory 224 to provide first-in first-out (FIFO) buffering between the transmitter & receiver sets 220, 222. An embedded controller 228 coordinates the operation of the transmitters and receivers by, e.g., setting initial equalization parameters and ensuring the training phase is complete across all lanes and links before enabling the transmitters and receiver to enter the data transfer phase. The embedded controller 228 employs a set of registers 208 to receive commands and parameter values, and to provide responses potentially including status information and performance data.

In at least some contemplated embodiments, the host-facing transmitter and receiver set 220 employ fixed equalization parameters that are cable-independent, i.e., they are not customized on a cable-by-cable basis. The center-facing transmitter and receiver set 222 preferably employ cable-dependent equalization parameters that are customized on a cable-by-cable basis. The cable-dependent equalization parameters may be adaptive or fixed, and initial values for these parameters may be determined during manufacturer tests of the cable. The equalization parameters may include filter coefficient values for pre-equalizer filters in the transmitters, and gain and filter coefficient values for the receivers.

The illustrative cable of FIG. 3A may be a part of a point-to-point communications link between two host devices 302, 304 as shown in the architectural diagram of FIG. 3B. FIG. 3B shows the architecture using the ISO/IEC Model for Open Systems Interconnection (See ISO/IEC 7498-1:1994.1) for communications over a physical medium such as the twinaxial conductor pairs represented by channels 306. The interconnection reference model employs a hierarchy of layers with defined functions and interfaces to facilitate the design and implementation of compatible systems by different teams or vendors. While it is not a requirement, it is expected that the higher layers in the hierarchy will be implemented primarily by software or firmware operating on programmable processors while the lower layers may be implemented as application-specific hardware.

The Application Layer 308 is the uppermost layer in the model, and it represents the user applications or other software operating on different systems that need a facility for communicating messages or data. The Presentation Layer 310 provides such applications with a set of application programming interfaces (APIs) that provide formal syntax along with services for data transformations (e.g., compression), establishing communication sessions, connectionless communication mode, and negotiation to enable the application software to identify the available service options and select therefrom. The Session Layer 312 provides services for coordinating data exchange including: session synchronization, token management, full- or half-duplex mode implementation, and establishing, managing, and releasing a session connection. In connectionless mode, the Session Layer may merely map between session addresses and transport addresses.

The Transport Layer 314 provides services for multiplexing, end-to-end sequence control, error detection, segmenting, blocking, concatenation, flow control on individual connections (including suspend/resume), and implementing end-to-end service quality specifications. The focus of the Transport Layer 314 is end-to-end performance/behavior. The Network Layer 316 provides a routing service, determining the links used to make the end-to-end connection and when necessary acting as a relay service to couple together such links. The Data link layer 318 serves as the interface to physical connections, providing delimiting, synchronization, sequence and flow control across the physical connection. It may also detect and optionally correct errors that occur across the physical connection. The Physical layer 322 provides the mechanical, electrical, functional, and procedural means to activate, maintain, and deactivate channels 306, and to use the channels 306 for transmission of bits across the physical media.

The Data Link Layer 318 and Physical Layer 322 are subdivided and modified slightly by IEEE Std 802.3-2015, which provides a Media Access Control (MAC) Sublayer 320 in the Data Link Layer 318 to define the interface with the Physical Layer 322, including a frame structure and transfer syntax. Within the Physical Layer 322, the standard provides a variety of possible subdivisions such as the one illustrated in FIG. 3B, which includes an optional Reconciliation Sublayer 324, a Physical Coding Sublayer (PCS) 326, a Forward Error Correction (FEC) Sublayer 328, a Physical Media Attachment (PMA) Sublayer 330, a Physical Medium Dependent (PMD) Sublayer 332, and an Auto-Negotiation (AN) Sublayer 334.

The optional Reconciliation Sublayer 324 merely maps between interfaces defined for the MAC Sublayer 320 and the PCS Sublayer 326. The PCS Sublayer 326 provides scrambling/descrambling, data encoding/decoding (with a transmission code that enables clock recovery and bit error detection), block and symbol redistribution, PCS alignment marker insertion/removal, and block-level lane synchronization and deskew. To enable bit error rate estimation by components of the Physical Layer 322, the PCS alignment markers typically include Bit-Interleaved-Parity (BIP) values derived from the preceding bits in the lane up to and including the preceding PCS alignment marker.

The FEC Sublayer 328 provides, e.g., Reed-Solomon coding/decoding that distributes data blocks with controlled redundancy across the lanes to enable error correction. In some embodiments (e.g., in accordance with Article 91 or proposed Article 134 for the IEEE Std 802.3), the FEC Sublayer 328 modifies the number of lanes (Article 91 provides for a 20-to-4 lane conversion).

The PMA Sublayer 330 provides lane remapping, symbol encoding/decoding, framing, and octet/symbol synchronization. The PMD Sublayer 332 specifies the transceiver conversions between transmitted/received channel signals and the corresponding bit (or digital symbol) streams. An optional AN Sublayer 334 is shown as a internal element of the PMD Sublayer 332, and it implements an initial start-up of the communications channels, conducting an auto-negotiation phase and a link-training phase before entering a normal operating phase. The auto-negotiation phase enables the end nodes to exchange information about their capabilities, and the training phase enables the end nodes to adapt both transmit-side and receive-side equalization filters in a fashion that combats the channel non-idealities. A receptacle 336 is also shown as part of the PMD sublayer 332 to represent the physical network interface port.

The connectors 100, 101, have plugs 200, 201 that mate with the receptacles 336 of the two host devices 302, 304. Within each connector, the DRR devices may implement a host-facing Physical Layer 322A, a center-facing Physical Layer 322B, and a Data Link Layer 340 that bridges together the two Physical Layers. In some embodiments, one or more of the internal sublayers within each connector (e.g., FEC, PCS, Reconciliation, MAC) are bypassed or omitted entirely to reduce areal requirements and/or to reduce power. More information regarding the operation of the sublayers, as well as the electrical and physical specifications of the connections between the nodes and the communications medium (e.g., pin layouts, line impedances, signal voltages & timing), and the electrical and physical specifications for the communications medium itself (e.g., conductor arrangements in copper cable, limitations on attenuation, propagation delay, signal skew), can be found in the current Ethernet standard, and any such details should be considered to be well within the knowledge of those having ordinary skill in the art.

Figure 4:
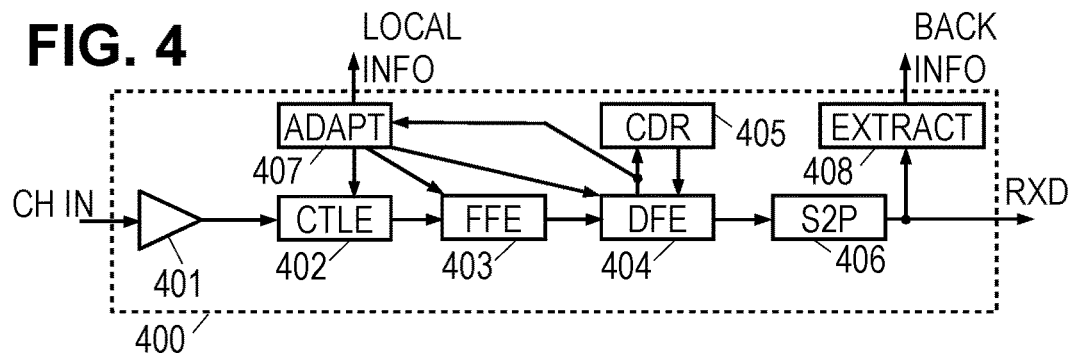
FIG. 4 is a block diagram of a receiver in an illustrative multi-lane data recovery and remodulation (DRR) device.
Figure 5:
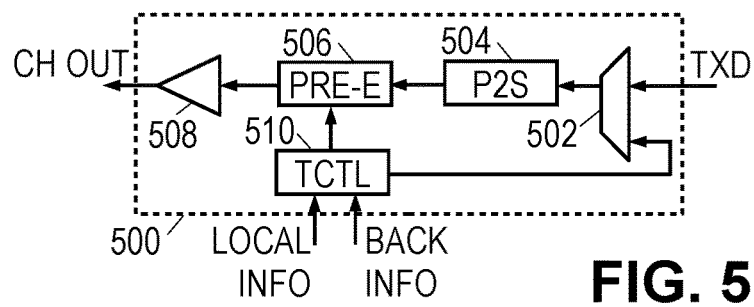
FIG. 5 is a block diagram of a transmitter in an illustrative multi-lane DRR device.

The MAC, Reconciliation, PCS, FEC, PMA, and PMD Sublayers, may be implemented as application-specific integrated circuitry to enable high-rate processing and data transmission. The receiver and transmitter sets 220, 222, may implement the PMA and PMD sublayers. FIGS. 4 and 5 are block diagrams of an illustrative receiver and an illustrative transmitter that may be members of the sets 220, 222.

In FIG. 4, receiver 400 receives an analog electrical signal (CH_IN) and supplies it to an optional low noise amplifier (LNA) 401. If included, the LNA 401 provides a high input impedance to minimize channel loading and amplifies the received electrical signal to drive the input of a continuous time linear equalization (CTLE) filter 402. CTLE filter 402 provides continuous time filtering to shape the signal spectrum to reduce the length of the channel impulse response while minimizing leading inter-symbol interference (ISI). A digital feed-forward equalization (FFE) filter 403 may be used to augment the performance of the CTLE filter 402. A decision feedback equalizer (DFE) 404 operates on the filtered signal to correct for trailing ISI and detect each transmitted channel bit or symbol, thereby producing a demodulated digital data stream. Some receiver embodiments employ oversampling in the FFE 403 and DFE 404. A clock and data recovery (CDR) circuit 405 extracts a clock signal from the filtered signal and/or the digital data stream and supplies it to DFE 404 to control sample and symbol detection timing. A serial-to-parallel circuit 406 groups the digital data stream bits or symbols into blocks to enable subsequent on-chip operations to use lower clock rates. The symbols or data blocks are placed on the digital receive bus (RXD) for remodulation and transmission by a transmitter to the remote end of the channel.

While certain contemplated cable embodiments do not support auto-negotiation, other contemplated embodiments do support auto-negotiation in accordance with the Ethernet standard. When supported, the auto-negotiation may be implemented as described in PCT/CN2017/075961, titled "Ethernet link extension method and device" by inventors Yifei Dai, Haoli Qian, and Jeff Twombly, and filed 2017 Mar. 8. A detector or packet information extractor 408 monitors the receive signal for the end of the auto-negotiation phase and/or the beginning of the training phase frames. Whether or not autonegotiation is supported, a training phase may be performed during the manufacturing process to set initial values of the equalization parameters for the completed cable.

During the training phase, a filter adaptation circuit 407 measures an error between the input and output of a decision element in DFE 404, employing that error in accordance with well-known techniques from the literature on adaptive filtering to determine adjustments for the coefficients in CTLE filter 402, FFE filter 403, DFE 404, and a transmit filter 506 (discussed further below), and to determine whether convergence has been achieved. The adaptation circuit 407 adjusts the coefficient values of elements 402-404 and outputs locally-generated information (LOCAL_INFO), which includes the transmit filter coefficient adjustments and the convergence status. Where the system supports the use of a backchannel, the LOCAL_INFO is supplied to a local transmitter 500 that communicates in the reverse direction on the data lane. The local transmitter communicates the transmit filter adjustments and the convergence status via the backchannel to the source of the CH_IN signal. In that vein, the received signal includes back-channel information from the source of the CH_IN signal. A packet information extractor 408 detects the back-channel information (BACK_INFO) and passes it to the local transmitter 500. In the absence of a backchannel, the LOCAL_INFO may be communicated via the host-interface to the testing apparatus as discussed further below. Once convergence is achieved, receiver 400 is ready to begin normal operations.

In FIG. 5, transmitter 500 receives blocks of channel bits or symbols for transmission to the source of the CH_IN signal (FIG. 4). During normal operations, multiplexer 502 supplies blocks of channel bits or symbols from the remote source (received on the TXD bus) to the parallel to serial (P2S) circuit 504. P2S circuit converts the blocks into a digital data stream. A transmit filter 506, also called a pre-equalization filter, converts the digital data stream into an analog electrical signal with spectral shaping to combat channel degradation. Driver 508 amplifies the analog electrical signal to drive the channel output (CH_OUT) node.

The current IEEE standard provides for up to four taps in the transmit filter, but at least some contemplated cable embodiments employ up to 30 or more taps in the transmit filter. This "long-tap" filter provides sufficient equalization for the receiver to minimize, or even eliminate, the FFE filter and achieve a significant power savings.

If supported, the auto-negotiation phase may be implemented as set forth in Y. Dai et al. During the training phase, multiplexer 502 obstructs information from the TXD bus, instead supplying P2S circuit 504 with training frames from a training controller 510. The training controller 510 generates the training frames based on the convergence status and transmit filter coefficient adjustments (LOCAL_INFO) received from the local receiver 400. That is, in addition to training patterns, the training frames may include backchannel information to be used by the remote end of the channel.

Note that even after the local receiver indicates filter convergence has occurred, the training controller 510 may prolong the training phase to coordinate training phase timing across lanes and along each link of the channel. The training frames include training sequences as specified by the relevant portions of the current Ethernet standard (IEEE Std 802.3).

The training controller 510 further accepts any back-channel information (BACK_INFO) extracted by the local receiver 400 from received training frames sent by the local end node. The training controller applies the corresponding adjustments to the coefficients of transmit filter 506. Upon conclusion of the training phase, multiplexer 502 begins forwarding TxD blocks to the P2S circuit 504.

Within the foregoing context of an illustrative implementation, we now return to the block diagram of FIG. 3A. The connector 200, DRR device 202, MCU device 206, and switch 210, may be mounted to a paddle card, i.e., a printed circuit card encased in the connector body. The connector 200 may be a pluggable module compliant with any one of the pluggable module standards, e.g., SFP, SFP-DD, QSF, QSFP-DD, OSF. Most of these standards include a two-wire interface (typically an I2C bus) that enables the host to monitor, debug, or control the pluggable module via the host interface. The two-wire interface protocol is a master-slave protocol, with the host expected to be the bus master and the module expected to be the slave. The MCU device 206 operates as an I2C bus slave to communicate with the I2C bus master on the host side.

The MCU device 206 relies on bootup code and firmware stored in the embedded flash memory 207 to handle the power-on process and coordinate the operations of the other paddle card components, including the DRR device, the switch 210, and power management chip (not shown). The DRR device itself includes an embedded controller 228 that coordinates operation of the other on-chip components, among other things providing lane control and adaptation of filter coefficients in the receivers. The embedded controller 228 accesses the registers 208 via a high speed internal bus, while the MCU device 206 accesses them via a two-wire interface such as the I2C bus or an MDIO interface protocol. The embedded controller 228 and the MCU device 206 can accordingly exchange data by reading and writing the register fields.

For developing and debugging the operation of the cable electronics, it is desirable for the host to have access to all of the SerDes parameters, including the coefficients of the transmit and receive filters, the noise and error statistics (including equalization error, timing error, symbol error rates, and packet loss rates), link event logs, and buffer contents, for each host-facing and center-facing interface lane of the DRR device. Yet the time required to convey this information is prohibitive if the DRR device needs to communicate via the registers to the MCU and the MCU needs to then convey the data to the host.

Accordingly, each connector is provided with a number of features to facilitate debugging, to accelerate host access to the DRR device, and to enhance communications performance of the cable. These features include: transmit filter pre-training, expedited debug data capture, and an MCU bypass switch. These features are each described with reference to the flow diagram of FIG. 6.

Figure 6:
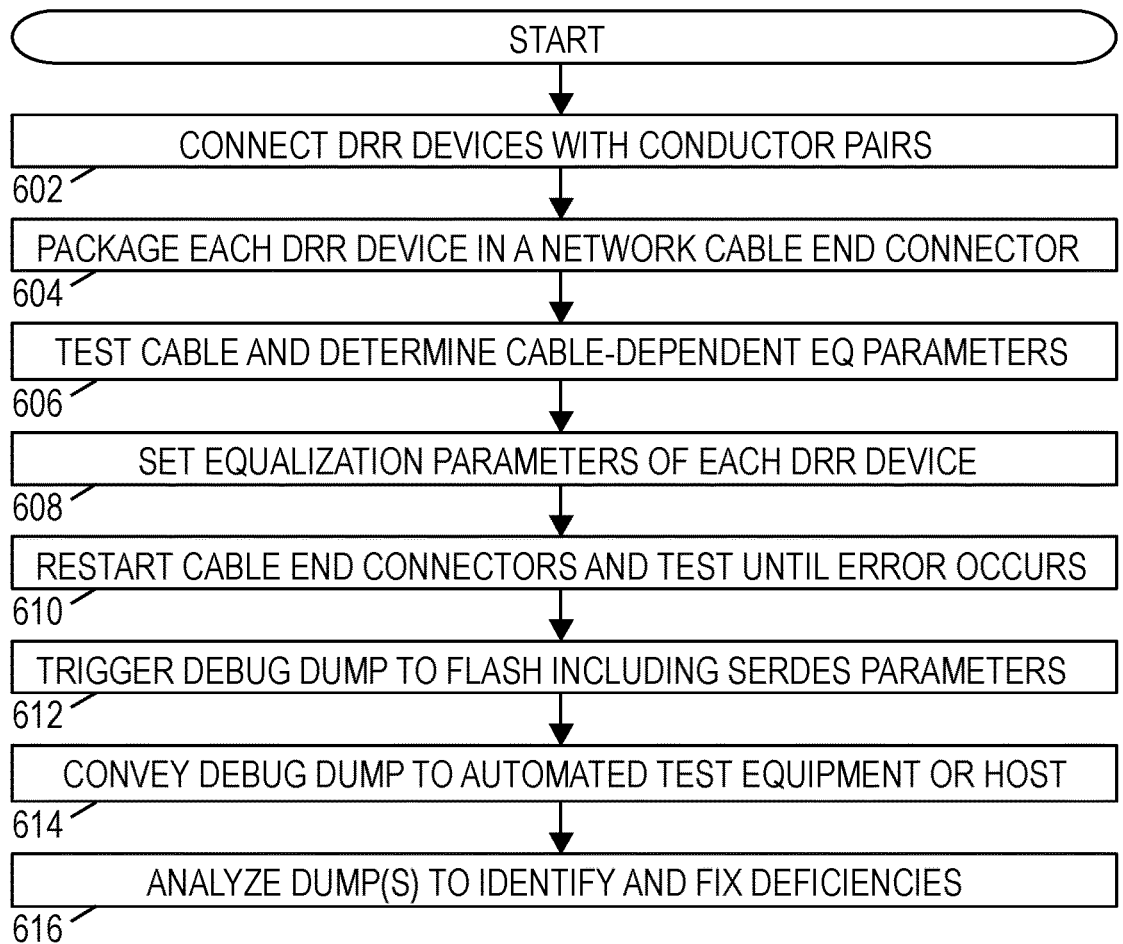
FIG. 6 is a flow diagram of an illustrative cable manufacturing method.

FIG. 6 shows an illustrative cable manufacturing method. It begins in block 602 with electrically connecting the ends of the conductor pairs in the cable cord to the paddle cards, and more specifically, to the center-facing interfaces of the first and second DRR devices. The connecting may be done by automated equipment soldering the wire ends to pads on the paddle cards on which the DRR devices are mounted. In block 604, the equipment packages each paddle card in a respective end connector for the network cable. As previously mentioned, the end connectors may be, e.g., SFP, SFP-DD, QSF, QSFP-DD, or OSF pluggable modules. The end connectors are adapted to mate with network interface ports of host devices, and include plugs that electrically connect with matching receptacles in the ports.

In block 606, the equipment tests the cable to verify compliance with performance specifications and to determine cable-dependent equalization parameters for use by the center-facing transmitter and receiver sets 222. The testing is performed by plugging each cable's end connectors into corresponding ports of automated testing equipment (ATE). As the connectors receive power, the MCU chip retrieves firmware code for itself from nonvolatile memory such as an internal flash memory, executing it to coordinate the bootup and operation of the other connector components. The internal flash memory may further include firmware for the embedded controller of the DRR device, and if so, the MCU chip conveys the firmware to the embedded controller via a two wire bus such as I2C or MDIO. In some contemplated embodiments, the two wire bus supports both the I2C protocol and the faster MDIO protocol, and the DRR device switch from one protocol to the other on demand. Once the firmware has been loaded, the MCU chip instructs the embedded controller to execute the firmware. Once both the MCU chip and DRR device are both working, the end connector operates as previously described above.

Channel estimation and equalization are key elements of high bandwidth communication. While the host-facing transmitters and receivers may only need to contend with negligible signal distortion, the center-facing transmitters and receivers will generally have to accommodate severe signal attenuation and distortion. As described with reference to FIG. 4, the equalization may be performed in the receivers using a combination of CTLE, FFE, and DFE elements. While such equalization is very effective, channels with severe signal distortion may require the use of many filter taps (and coefficients) in the FFE filter and DFE feedback filter, leading to prohibitive levels of power consumption and dissipation. The use of a transmitter equalization filter (aka pre-equalization, pre-distortion, or pre-shaping) enables the use of far fewer taps in the receive filters, potentially enabling the FFE filter to be omitted entirely. While additional filter taps are implemented in the transmitter, the net result is that a substantial reduction in the power consumption level is achieved due to a number of factors including avoidance of the noise enhancement often associated with receiver-side equalization and digital filtering with a reduced bit-width.

In block 606, the DRR devices set their transmit and receive filter coefficients to initial default values. As the communications link is established, the center-facing transmitters and receivers may optionally engage in a training phase to adapt the filter coefficient values. Alternatively, or in addition, the automated testing equipment may begin sending and receiving a training pattern such as, e.g., a pseudo-random binary sequence (PRBS), enabling optional adaptation of the filter coefficients. As yet another alternative or addition, the filter coefficient values may be maintained while the automated test equipment correlates collected error measurements to the training patterns to estimate residual intersymbol interference (ISI). Such residual ISI estimates can be combined with knowledge of the filter coefficient settings to determine, directly or iteratively, the optimum transmit and receive filter coefficient values.

In block 608, the automated tester equipment "burns" the flash memory or otherwise programs the initial default values of the filter coefficients to be the optimum values identified in block 606. The communication between the DRR devices and the ATE to, e.g., collect channel estimation information and refine the default coefficient values, occurs via a two wire interface built in to the pins of the connector plug. Preferably the two wire interface supports the well known I2C protocol for maximum acceptance. However, the I2C protocol may be limited to a maximum clock rate of 1 MHz, limiting the bandwidth of the information collection process and prolonging the time required for the ATE to determine and program the optimum filter coefficient values. Accordingly, at least some contemplated embodiments also support the use of the MDIO interface protocol which can employ clock rates up to at least 10 MHz, significantly reducing the time required by the ATE. The ATE may establish initial communication with the MCU chip using the I2C protocol, then the ATE and the MCU chip may coordinate a dynamic switch to the faster MDIO protocol for the duration of the channel characterization and firmware programming.

The two-wire interface enables the ATE to communication with the MCU chip, and optionally relies on the MCU chip to access the DRR device registers. This two-step process may prolong the duration of the testing and debugging operations. To enable the ATE to obtain direct access to the DRR device, at least some contemplated embodiments include a bypass switch 210. The ATE initially establishes communication with the MCU chip 206 and instructs the MCU chip 206 to close the bypass switch 210, shorting the two wire bus from the connector plug to the two wire bus from the DRR device. The MCU device 206 may continue to monitor the bus to detect when the ATE wishes to terminate the bypass operations. The bypass switch is preferably an analog switch, though other switch implementations would also be suitable.

In some embodiments, the ATE communicates with the MCU during the initial link-up using the I2C protocol. The ATE writes to a particular address in the MCU to enable Debug mode, causing the MCU to close the bypass switch and enable direct communications between the ATE and the DRR devices. At this time, the ATE may switch to the MDIO protocol for communicating with the DRR device to take advantage of the speed enhancement. In other situations such as on-site debugging, the host may not support the use of the MDIO protocol and may continue to employ I2C for direct communication with the DRR device.

Once the filter coefficient values have been programmed, the cable manufacturing process is nominally complete. In practice, however, it is desired to verify the proper operation of the cable and, in the event any failures are detected, it is desirable to debug the potential causes of the failure. Accordingly, the illustrated method includes block 610, in which the cable is manually or electrically "unplugged" and "re-plugged" into the same or different receptacles to reboot the cable hardware. As part of the reboot, the filter coefficients are set to their default values from the flash memory. The ATE applies a test data sequence to the cable to verify proper operation. If no errors are detected, such as e.g., inadequate signal margins, excessive symbol error rates, lost packets, or link failures, the cable operation is verified and the process completes. The cable may then be packaged and sold to customers expecting robust performance.

On the other hand, if errors are detected at this point, or optionally if they are later detected in the field, the ATE or host may trigger a debug dump in block 612. The ATE or host uses the two-wire bus to write a register in the MCU chip to initiate the debug dump. After receiving the dump command, the MCU chip may trigger an interrupt of the embedded controller by writing the associated register in the DRR device. The interrupt causes the embedded controller to capture all the serdes parameters in memory. The serdes parameters may include, e.g., link status, frequency offset, signal margin (aka eye height).

As the memory in the DRR device is primarily volatile memory (SRAM), the DRR device in block 614 writes the captured information word by word to the registers, enabling ATE or host to retrieve the captured information via the two wire bus and/or enabling the MCU chip to read and store the information in nonvolatile memory (flash). If the latter option is used, perhaps in the field by a host lacking the facilities for parsing and analyzing the debug dump, the cable can later be plugged into automated test equipment that retrieves the captured information from the nonvolatile memory.

In block 616, the ATE provides the captured information to a computer that enables engineers to analyze the debug dump to identify the cause(s) of the failures. With knowledge of the causes, engineers can correct the vulnerabilities by re-training the filters, by updating the firmware, and/or by adjusting the hardware design.

These techniques can drastically reduce the testing time in the manufacturing facilities where the ATE acts as a host. They can also speed up the debug process either on the ATE or also on the customer switch.

Numerous alternative forms, equivalents, and modifications will become apparent to those skilled in the art once the above disclosure is fully appreciated. It is intended that the claims be interpreted to embrace all such alternative forms, equivalents, and modifications that are encompassed in the scope of the appended claims.

What is claimed is:

1. A cable that comprises:
   a first data recovery and re-modulation (DRR) device that exchanges inbound and outbound multi-lane data streams with a first host interface port via a first end connector plug;
   a second DRR device that exchanges inbound and outbound multi-lane data streams with a second host interface port via a second end connector plug; and
   electrical conductors connecting the first and second DRR devices to convey electrical transit signals therebetween,
   the first DRR device converting between said electrical transit signals and said inbound and outbound multi-lane data streams for the first host interface port, and
   the second DRR device converting between said electrical transit signals and said inbound and outbound multi-lane data streams for the second host interface port,
   the first and second DRR devices providing pre-equalization of the electrical transit signals using transmit filter coefficient values stored in nonvolatile memories.

2. The cable of claim 1, further comprising a first controller that configures the first DRR device in response to a power-on event, the first controller retrieving the transmit filter coefficient values from the nonvolatile memories as part of said configuring.

3. The cable of claim 1, wherein the first and second DRR devices are programmed to use the transmit coefficient values each time power is supplied to the first and second end connector plugs.

4. The cable of claim 3, wherein the transmit filter coefficient values are determined and stored in the nonvolatile memories after assembly of the cable.

5. The cable of claim 4, wherein the first and second DRR devices employ receiver-based equalization of the electrical transit signals using coefficient values stored in the nonvolatile memories.

6. The cable of claim 4, wherein the electrical conductors comprise twin-axial conductors that carry each of the electrical transit signals in differential form.

7. The cable of claim 1, wherein the first and second DRR devices do not perform pre-equalization of the multi-lane data streams provided to the first and second host interface ports.

8. A cable manufacturing method that comprises:
connecting a first connector plug to a first data recovery and re-modulation (DRR) device that exchanges multi-lane data streams with a first host interface port via the first connector plug;
connecting a second connector plug to a second DRR device that exchanges multi-lane data streams with a second host interface port via the second connector plug;
connecting electrical conductors to the first and second DRR devices to convey electrical transit signals therebetween,
the first DRR device converting between said electrical transit signals and said multi-lane data streams for the first host interface port, and
the second DRR device converting between said electrical transit signals and said multi-lane data streams for the second host interface port,
the first and second DRR devices providing pre-equalization of the electrical transit signals using transmit filter coefficient values stored in nonvolatile memories.

9. The method of claim 8, further comprising: providing a first controller device that configures the first DRR device in response to a power-on event, the first controller device retrieving the transmit filter coefficient values from an internal nonvolatile memory as part of said configuring.

10. The method of claim 8, further comprising: programming the first and second DRR devices to use the transmit coefficient values each time power is supplied to the first and second end connector plugs.

11. The method of claim 10, further comprising: after connecting the electrical conductors, characterizing channel characteristics of the electrical conductors to determine the transmit filter coefficient values; and storing the transmit filter coefficient values in the nonvolatile memories.

12. The method of claim 11, wherein the first and second DRR devices employ receiver-based equalization of the electrical transit signals using coefficient values stored in the nonvolatile memories.

13. The method of claim 11, wherein the electrical conductors comprise twin-axial conductors that carry each of the electrical transit signals in differential form.

14. The method of claim 8, wherein the first and second DRR devices do not perform pre-equalization of the multi-lane data streams provided to the first and second host interface ports.

15. A communications method that comprises:
inserting a first end connector plug of a cable into a first host interface port, the first end connector plug being connected to a first data recovery and re-modulation (DRR) device that converts a multi-lane data stream from the first host interface port into electrical transit signals conveyed by electrical conductors to a second DRR device connected to a second end connector plug of the cable; and
inserting the second end connector plug of the cable into a second host interface port, the second DRR device converting a multi-lane data stream from the second host interface port into electrical transit signals conveyed by electrical conductors to the first DRR device,
the first and second DRR devices providing pre-equalization of the electrical transit signals using transmit filter coefficient values stored in nonvolatile memories.

16. The method of claim 15, further comprising: supplying power to the first and second end connector plugs, the first and second end connector plugs being connected to first and second controller devices, respectively, each of the first and second controller devices operating to configure the first and second DRR devices in response to a power-on event, the configuring including retrieving the transmit filter coefficient values from internal nonvolatile memory.

17. The method of claim 15, wherein the first and second DRR devices are programmed to use the transmit coefficient values each time power is supplied to the first and second end connector plugs.

18. The method of claim 17, wherein the transmit filter coefficient values are determined and stored in the nonvolatile memories after assembly of the cable.

19. The method of claim 18, wherein the first and second DRR devices employ receiver-based equalization of the electrical transit signals using coefficient values stored in the nonvolatile memories.

20. The method of claim 15, wherein the first and second DRR devices do not perform pre-equalization of the multi-lane data streams provided to the first and second host interface ports.

* * * * *